(12) United States Patent
Murphy et al.

(10) Patent No.: US 9,056,284 B2
(45) Date of Patent: Jun. 16, 2015

(54) CHLORINE RESISTANT AMIDES, POLYAMIDES, AND MEMBRANES MADE FROM THE SAME

(75) Inventors: Andrew Patrick Murphy, Littleton, CO (US); Robert Lee Riley, La Jolla, CA (US); Yuliana Elvira Porras Mendoza, Arvada, CO (US)

(73) Assignee: The United States of America, as represented by The Secretary of the Interior, Washington, DC (US)

( * ) Notice: Subject to any disclaimer, the term of this patent is extended or adjusted under 35 U.S.C. 154(b) by 288 days.

(21) Appl. No.: 13/572,431

(22) Filed: Aug. 10, 2012

(65) Prior Publication Data

US 2014/0042082 A1 Feb. 13, 2014

(51) Int. Cl.
| | | |
|---|---|---|
| *B01D 39/00* | (2006.01) | |
| *B01D 29/00* | (2006.01) | |
| *B01D 29/46* | (2006.01) | |
| *B01D 63/00* | (2006.01) | |
| *B01D 61/00* | (2006.01) | |
| *B01D 71/56* | (2006.01) | |
| *C08G 69/32* | (2006.01) | |
| *C08G 69/42* | (2006.01) | |
| *C08L 77/10* | (2006.01) | |
| *B01D 67/00* | (2006.01) | |
| *B01D 69/12* | (2006.01) | |

(52) U.S. Cl.
CPC ............... *B01D 71/56* (2013.01); *C08G 69/32* (2013.01); *C08G 69/42* (2013.01); *C08L 77/10* (2013.01); *B01D 67/0006* (2013.01); *B01D 69/125* (2013.01); *B01D 2325/30* (2013.01)

(58) Field of Classification Search
CPC .......... B01D 71/56; B01D 69/00; C08G 69/00
USPC .......... 210/500.28, 490, 500.38; 427/244–245
See application file for complete search history.

(56) References Cited

U.S. PATENT DOCUMENTS

| | | | | |
|---|---|---|---|---|
| 3,349,062 A | * | 10/1967 | Hill et al. ................ | 528/183 |
| 3,878,109 A | | 4/1975 | Ikeda et al. | |
| 3,883,628 A | * | 5/1975 | Martin ...................... | 264/54 |
| 3,993,625 A | | 11/1976 | Kurihara et al. | |
| 4,217,227 A | | 8/1980 | Elfert et al. | |
| 4,259,183 A | | 3/1981 | Cadotte | |
| 4,277,344 A | | 7/1981 | Cadotte | |

(Continued)

FOREIGN PATENT DOCUMENTS

EP    0 085 111    8/1983

OTHER PUBLICATIONS

Murphy, A. et al. "Development of a New Chlorine and Biofouling Resistant Polyamide Membrane" (Feb. 12, 2003), Annual Report Jan. 2003 thru Jan. 2004 SST Report Jan. 4, 2002, p. 1-68.

(Continued)

*Primary Examiner* — Ana Fortuna
(74) *Attorney, Agent, or Firm* — John D. Fado; Howard V. Owens, Jr.

(57) ABSTRACT

A chlorine resistant polyamide is formed from the reaction product of an amine and an acid chloride monomer wherein both the amine and the acid chloride monomer are modified with electron-withdrawing groups that exhibit sufficient activity to (i) minimize any chlorination on both the amine and acid chloride and (ii) minimize N-chlorination. A membrane is made from the polyamide for use, for example, in a desalination unit.

9 Claims, 1 Drawing Sheet

(56) References Cited

U.S. PATENT DOCUMENTS

| | | | |
|---|---|---|---|
| 4,529,646 A | 7/1985 | Sundet | |
| 4,606,943 A | 8/1986 | Rak et al. | |
| 4,661,254 A | 4/1987 | Zupancic et al. | |
| 4,739,103 A | 4/1988 | Hansen et al. | |
| 4,761,234 A | 8/1988 | Uemura et al. | |
| 4,772,394 A | 9/1988 | Swedo et al. | |
| 4,812,238 A | 3/1989 | Cadotte et al. | |
| 4,830,885 A | 5/1989 | Tran et al. | |
| 4,859,384 A * | 8/1989 | Fibiger et al. | 264/45.1 |
| 4,876,009 A | 10/1989 | McCray | |
| 4,885,091 A | 12/1989 | Swedo et al. | |
| 4,888,116 A | 12/1989 | Cadotte et al. | |
| 4,913,816 A | 4/1990 | Waite | |
| 4,950,404 A | 8/1990 | Chau | |
| 4,960,517 A | 10/1990 | Cadotte | |
| 4,978,455 A * | 12/1990 | McCray | 210/654 |
| 5,015,380 A | 5/1991 | Sundet | |
| 5,085,777 A | 2/1992 | Arthur | |
| 5,234,595 A | 8/1993 | DiGregorio et al. | |
| 5,271,843 A | 12/1993 | Chau et al. | |
| 5,582,725 A | 12/1996 | McCray et al. | |
| 5,658,460 A | 8/1997 | Cadotte et al. | |
| 5,693,227 A | 12/1997 | Costa | |
| 5,693,231 A | 12/1997 | Johnson et al. | |
| 5,876,602 A | 3/1999 | Jons et al. | |
| 5,922,104 A | 7/1999 | Park et al. | |
| 6,406,626 B1 | 6/2002 | Murakami et al. | |
| 7,081,202 B2 | 7/2006 | Ohara et al. | |
| 7,384,552 B2 | 6/2008 | Calundann et al. | |
| 7,806,275 B2 * | 10/2010 | Murphy et al. | 210/500.38 |
| 8,475,804 B2 * | 7/2013 | Johansen et al. | 424/204.1 |
| 2003/0183576 A1 | 10/2003 | Ohara et al. | |
| 2006/0039890 A1 * | 2/2006 | Renshaw et al. | 424/78.16 |
| 2008/0277333 A1 * | 11/2008 | Murphy et al. | 210/500.33 |
| 2010/0173083 A1 * | 7/2010 | Ohara et al. | 427/373 |
| 2010/0216899 A1 | 8/2010 | Allen et al. | |
| 2011/0203990 A1 * | 8/2011 | Murphy et al. | 210/500.38 |
| 2013/0112619 A1 * | 5/2013 | Livingston et al. | 210/644 |
| 2013/0327714 A1 * | 12/2013 | Alrasheed et al. | 210/652 |
| 2014/0042082 A1 * | 2/2014 | Murphy et al. | 210/500.33 |
| 2014/0263024 A1 * | 9/2014 | Murphy et al. | 210/321.6 |

OTHER PUBLICATIONS

Murphy, A. et al. "Development of a New Chlorine and Biofouling Resistant Polyamide Membrane" (Apr. 21, 2005), Annual Report Jan. 2004 thru Jan. 2005 SST Report Jan. 8, 2002, p. 1-224.

The International Bureau of WIPO, Patent Cooperation Treaty, International Preliminary Report on Patentability, International Application No. PCT/US2008/052919, Nov. 10, 2009.

* cited by examiner

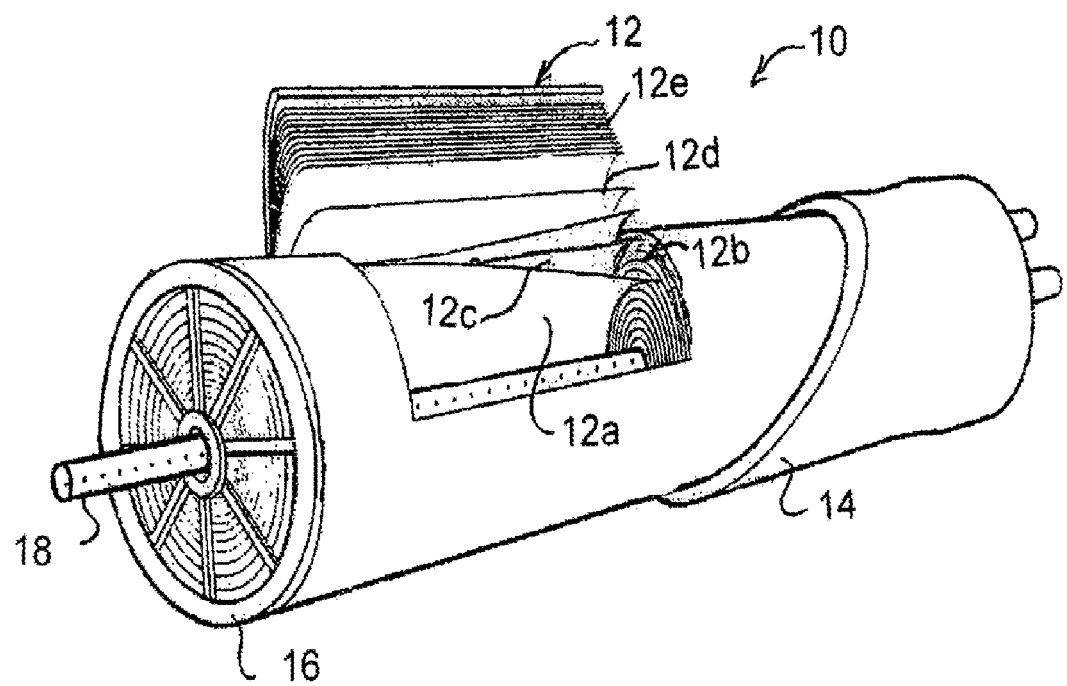

CHLORINE RESISTANT AMIDES, POLYAMIDES, AND MEMBRANES MADE FROM THE SAME

BACKGROUND OF THE INVENTION

1. Field of the Invention

The present invention relates to chlorine resistant amide polymers and to membranes made from such and to methods of using said polymers and membranes.

2. Description of the Related Art

The desalting membrane of choice worldwide is a polyamide (PA) membrane. PA membranes are made by forming a thin PA film on a finely porous surface of a polysulfone (PS) supporting membrane by an interfacial reaction between the reactant pair trimesoyl chloride (TMC) and m-phenylenedimaine (MPD). The following equation illustrates the chemical formation of a PA desalination barrier:

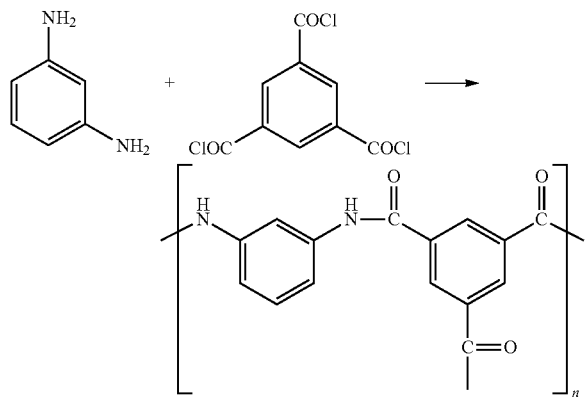

In the above equation, the first term represents m-phenylenediamine in water, the second term represents the trimesoyl chloride in hydrocarbon, and the resultant term represents the fully aromatic polyamide thin film. This is the equation for the PA thin-film composite membrane developed by Cadotte and E. E. Erickson (Desalination, Volume 32, 25-31, 1980) and, as indicated above, is the membrane in common use throughout the world.

A great need exists to improve the stability of the present state-of-the-art membranes used for chlorine disinfection. Such improvement is critical, for example, in reverse osmosis (RO) plants operating on wastewaters, surface waters, and open seawater intakes wherein disinfection by chlorination is required to control the growth of microorganisms (so-called biofouling) on the surface of the membrane. These PA membranes are so susceptible to deterioration by chlorine that a dechlorination step is required when chlorine is used as a disinfectant in the pretreatment. It will be understood that dechlorination prior to the PA membrane creates additional costs and effectively nullifies disinfection on the membrane surface where disinfection is needed. It is also noted that such dechlorination does not neutralize all chlorine, and the small amount of residual chlorine shortens membrane life.

U.S. Pat. No. 7,806,275 (Murphy et al) teach chlorine resistant polyamides modified with electron-withdrawing groups are useful to make PA membranes, useful in desalination units, that exhibit sufficient activity to minimize any chlorination on both the amine and acid chloride side and minimize N-chlorination. The patent states that attempting to add electron-withdrawing groups to the amine side of the membrane would create a number of problems including: (1) difficulties in obtaining precursors and overall synthesis; (2) an increase in electron-withdrawing away from the nitrogen; (3) resonance problems resulting in ring chlorination; (4) water solubility problems arising from the addition of hydrophobic groups; (5) less reactivity during interfacial polymerization; and (6) all successful membranes made based on amine modification show problems with flux.

While there are various PA membranes useful for desalination, there still remains a need in the art for a more effective membrane that is more tolerant to chlorine. The present invention, different from prior art systems, provides such a membrane that is useful, for example, for desalination.

SUMMARY OF THE INVENTION

It is therefore an object of the present invention is to provide a chlorine resistant polyamide made from the reaction product of an amine and an acid chloride to form a polymer wherein both the amine and acid chloride are each modified with at least one electron-withdrawing group providing electron withdrawing on both ends of the amide bond.

A still further object of the present invention is to provide a chlorine resistant polyamide made from the reaction product of an amine and an acid chloride to form a polymer wherein both the amine and acid chloride are each modified with at least one electron-withdrawing group wherein said acid chloride is selected from the group consisting of monofluorotrimesoyl (MFTMC), perfluorotrimesoyl chloride (PFTMC), nitrotrimesoyl chloride (NTMC), perchlorotrimesoyl chloride (PCTMC), 1,3,5-benzenetri-(difluoroacetoyl chloride) and mixtures thereof.

A still further object of the present invention is to provide a chlorine resistant polyamide made from the reaction product of an amine and an acid chloride to form a polymer wherein both the amine and acid chloride are each modified with at least one electron-withdrawing group wherein said amine is selected from the group consisting of 4-fluoro-m-phenylenediamine, 2-fluoro-m-diphenylenediamine, 3,5-diaminobenzotrifluoride, 4,6-difluorobenzene-1,5-diamine, and mixtures thereof.

Another object of the present invention is to provide a chlorine resistant polyamide membrane made from the reaction product of an amine and an acid chloride to form a polymer wherein both the amine and acid chloride are each modified with at least one electron-withdrawing group providing electron withdrawing on both ends of the amide bond.

A further object of the present invention is to provide a chlorine resistant polyamide membrane made from the reaction product of an amine and an acid chloride to form a polymer wherein both the amine and acid chloride are each modified with at least one electron-withdrawing group wherein said acid chloride is selected from the group consisting of monofluorotrimesoyl chloride (MFTMC), perfluorotrimesoyl chloride (PFTMC), nitrotrimesoyl chloride (NTMC), perchlorotrimesoyl chloride (PCTMC), 1,3,5-benzenetri-(difluoroacetoyl chloride) and mixtures thereof.

A still further object of the present invention is to provide a chlorine resistant polyamide membrane made from the reaction product of an amine and an acid chloride to form a polymer wherein both the amine and acid chloride are each modified with at least one electron-withdrawing group wherein said amine is selected from the group consisting of 4-fluoro-m-phenylenediamine, 2-fluoro-m-diphenylenediamine, 3,5-diaminobenzotrifluoride, 4,6-difluorobenzene-1, 5-diamine, and mixtures thereof.

Another object of the present invention is to provide a desalination unit having a membrane support that includes a chlorine resistant polyamide membrane wherein the chlorine resistant polyamide is a reaction produce of an amine and an acid chloride monomer wherein both the amine and the acid chloride monomer are modified with electron-withdrawing groups that exhibit activity to (i) minimize any chlorination on both the amine and acid chloride and (ii) minimize N-chlorination.

A still further object of the present invention is to provide a desalination unit having a membrane support that includes a chlorine resistant polyamide membrane wherein the chlorine resistant polyamide is a reaction produce of an amine and an acid chloride monomer wherein both the amine and the acid chloride monomer are modified with electron-withdrawing groups that exhibit activity to (i) minimize any chlorination on both the amine and acid chloride and (ii) minimize N-chlorination, wherein said amine of said chlorine resistant membrane is selected from the group consisting of 4-fluoro-m-phenylenediamine, 2-fluoro-m-diphenylenediamine, 3,5-diaminobenzotrifluoride, 4,6-difluorobenzene-1,5-diamine, and mixtures thereof.

A still further object of the present invention is to provide a desalination unit having a membrane support that includes a chlorine resistant polyamide membrane wherein the chlorine resistant polyamide is a reaction produce of an amine and an acid chloride monomer wherein both the amine and the acid chloride monomer are modified with electron-withdrawing groups that exhibit activity to (i) minimize any chlorination on both the amine and acid chloride and (ii) minimize N-chlorination, wherein said acid chloride is selected from the group consisting of monofluorotrimesoyl chloride (MFTMC), perfluorotrimesoyl chloride (PFTMC), nitrotrimesoyl chloride (NTMC), perchlorotrimesoyl chloride (PCTMC), 1,3,5-benzenetri-(difluoroacetoyl chloride) and mixtures thereof.

Further objects and advantages of the invention will become apparent from the following description.

BRIEF DESCRIPTION OF THE DRAWINGS

FIG. 1 is a perspective view of a desalination membrane unit.

DETAILED DESCRIPTION OF THE INVENTION

One aspect of the invention is a chlorine resistant polyamide wherein the acid chloride and the amine of a polyamide are modified with electron-withdrawing groups which minimize ring chlorination on both the acid and the amine side and minimize N-chlorination as well. In addition to electron-withdrawing, these chemical groups must have the correct p-orbitals or π system for resonance to occur, must be spatially small in size so they do not interfere in the polymerization process, must be non-ionizing, and must be fairly straightforward to synthesize from commercially available precursors to avoid high costs of making the compounds.

Another aspect of the present invention is a chlorine resistant polyamide membrane wherein the acid chloride and the amine of a polyamide are modified with electron-withdrawing groups which minimize ring chlorination on both the acid and the amine side and minimize N-chlorination as well. In addition to electron-withdrawing, these chemical groups must have the correct p-orbitals or π system for resonance to occur, must be spatially small in size so they do not interfere in the polymerization process, must be non-ionizing, and must be fairly straightforward to synthesize from commercially available precursors to avoid high costs of making the compounds.

The following equation is an example of the reaction to make the new polyamides and membranes of the present invention. Note the fluoro groups on both sides of the amide bond:

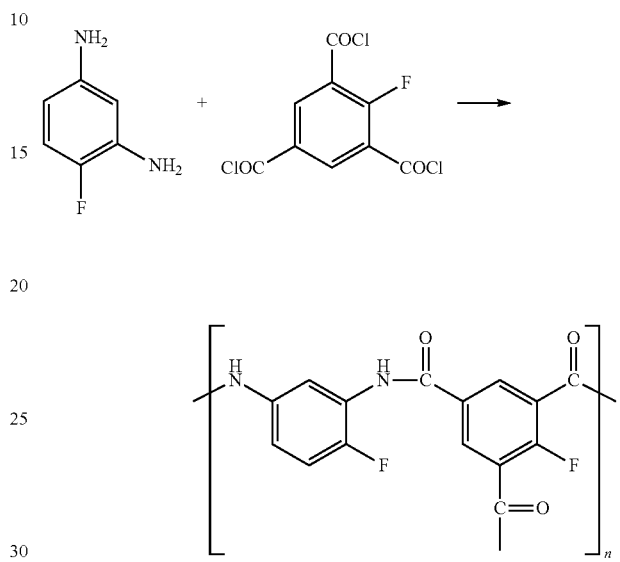

Also, note with this particular formulation that the fluoro groups are located ortho and para to the other groups on both rings, giving the correct electronics to permit electron-withdrawing on both sides of the amide bond.

Another aspect is the use of these membranes in a reverse osmosis desalination unit that includes a membrane support, a chlorine resistant membrane supported on the membrane support wherein the chlorine resistant membrane is a reaction product of an amine and an acid chloride that both contain electron-withdrawing groups that minimize ring chlorination on both the acid and the amine side and to minimize N-chlorination. An additional requirement is that these membranes of the present invention have good transport properties of salt rejection and flux.

The following acid chlorides have been found to be effective for use in synthesizing the chlorine resistant polyamide membrane of the invention (U.S. Pat. No. 7,806,275 Murphy et al; herein incorporated by reference in its entirety).

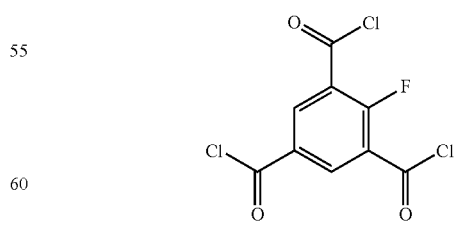

This compound is monofluorotrimesoyl chloride (MFTMC), and is not available commercially, but has been synthesized by the applicants. This is a preferred embodiment of useful acid chlorides.

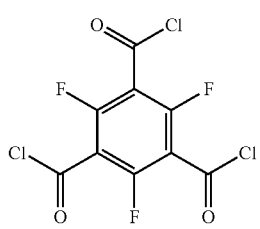 [SMILES: O=C(Cl)c1c(F)c(C(=O)Cl)c(F)c(C(=O)Cl)c1F]

This compound is perfluorotrimesoyl chloride (PFTMC), and is not available commercially.

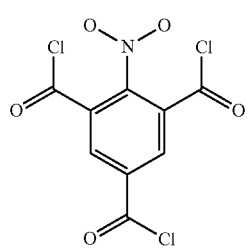 [SMILES: O=C(Cl)c1cc(C(=O)Cl)c(N(O)O)c(C(=O)Cl)c1]

This compound is nitrotrimesoyl chloride (NTMC) and is not available commercially.

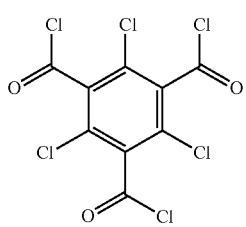

This compound is perchlorotrimesoyl chloride (PCTMC) and is not available commercially.

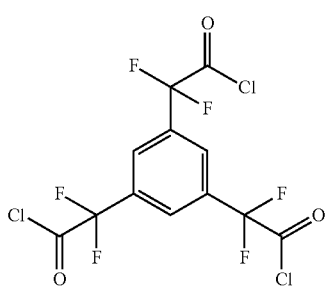 [SMILES: O=C(Cl)C(F)(F)c1cc(C(F)(F)C(=O)Cl)cc(C(F)(F)C(=O)Cl)c1]

This compound is 1,3,5-benzenetri-(difluoroacetoyl chloride) (BTFAC) and is not available commercially.

The first four of the above compounds have in common the TMC molecule with electron-withdrawing from fluoro, chloro, or nitro groups. The last compound may also be effective for the reasons given above. Further, in order to provide the highly cross-linked polymer system, difunctional acid chlorides such as 5-fluoro-isophthalic acid chloride and tri- or tetra-functional amines may also be used.

The following amines are useful in the present invention:

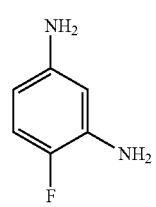

4-fluoro-m-diphenylenediamine

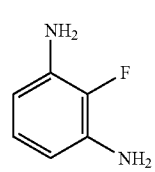

2-fluoro-m-diphenylenediamine

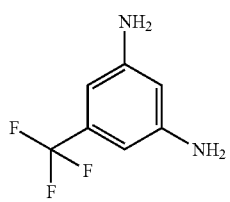 [SMILES: Nc1cc(N)cc(C(F)(F)F)c1]

3,5-diaminobenzotrifluoride

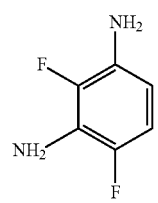

4,6-difluorobenzene-1,5-diamine

All of these above amines are available commercially.

The major thrust of the invention is modifications of both the amine and acid side of the chlorine resistant polymer. The groups that are added to both the amine and the acid are electron-withdrawing groups.

The following membrane is the best candidate:

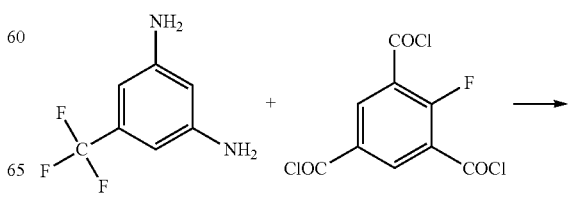

-continued

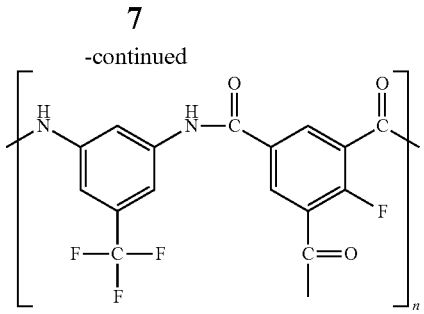

This is based on membrane data and chemical data from the corresponding linear polymer.

In the examples that follow, a new class of polyamides and polyamide membranes is exemplified showing chlorine resistant. It will be appreciated that chlorine resistant PA polymers should find a wide range of application in industry. Application could include linear and highly cross-linked polyamide polymers for the production of pipes, tanks and the like, fibers in clothing, chemically resistant coatings, flame retardant materials (due to the halogen groups), and chlorine resistant surfactants. Further, even in the area of membranes there is more than RO, and filtering processes such as microfiltration (MF), nanofiltration (NF), and ultrafiltration (UF) could all benefit from PA polymers having improved chlorine resistance.

Although the invention has many different applications as discussed above, one important application is in the manufacture of reverse osmosis (RO) membranes. Referring to FIG. 1, a spiral wound RO membrane unit 10 is shown which is typical of those currently used in desalting plants. Unit 10 includes a membrane element 12 which is constructed in accordance with the present invention. Because element 10 is conventional apart from membrane 12 and moreover, the appearance of membrane 12 would not be different for a conventional membrane, unit 10 will be only briefly described below by way of background. It will also be understood that membranes made by the methods of the present invention can be used in different membrane units than that shown in FIG. 1.

Unit 10 includes an outer pressure vessel 14 typically made of fiberglass with an anti-telescoping device or shell 16 at opposite ends thereof. An axially extending product tube 18 is located centrally of element 10, as shown. The membrane element 12 itself includes a salt rejecting membrane surface 12a which forms part of a membrane leaf 12b including a tricot spacer 12c, a mesh spacer 12d, and a membrane 12e. It will be appreciated that the membrane element 12 is the key component of unit 10 and defines the actual surface where salt is separated from water. In embodiments of the present invention, the membrane is made from the chlorine resistant polyamide of the present invention.

As described above, one aspect of the present invention is modifying polyamide polymers so they exhibit chemical stability in chlorine water environments. Because of the difficulty in obtaining chemical data from polymers, especially highly-cross linked polymer systems, the examples will show synthesis of amides which are then exposed to high concentrations of chlorinated water. These amides are smaller units; polyamides are composed of many amide units. However, the chemical principles of these amides that have been found apply directly to polyamide polymers.

EXAMPLE 1

These amides were synthesized by dissolving the acid chloride in acetone and the amine in pyridine. After stirring for approximately 30 minutes the amide was precipitated out in ice water and generally recrystallized from ethanol.

The amides described below were synthesized and exposed to chlorinated water. The chlorine concentrations were high to accelerate the degradation and simulate what occurs in actual reverse osmosis membranes. The compounds were subjected to the equivalent of approximately $2.4 \times 10^6$ ppm-hrs of chlorine over a period of approximately 48 hours. The chlorine exposures are approximately what a reverse osmosis membrane would receive after about 27.4 years of operation at approximately 1.0 mg/L chlorine.

Nuclear magnetic resonance (NMR) using the proton signal was performed on the amide products before and after chlorination using a Varian, Mercury 400 MHz instrument. The following four amides were synthesized:

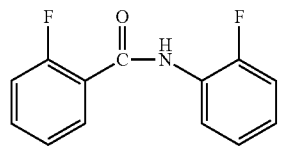 [SMILES: O=C(Nc1ccccc1F)c1ccccc1F]

NMR assignments for 2,2'-difluorobenzanilide

| | | | | | | |
|---|---|---|---|---|---|---|
| Before | 10.12 p (1) s | 7.81 p(1) t | 7.73 p (1) t | 7.60p (1) m | 7.34 p (2) q | 7.25 p (3) m |
| After | 10.12 p (1) s | 7.81 p(1) t | 7.73 p (1) t | 7.60p (1) m | 7.34 p (2) q | 7.25 p (3) m |

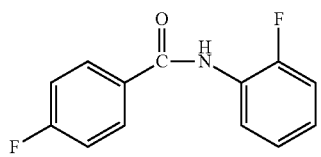 [SMILES: O=C(Nc1ccccc1F)c1ccc(F)cc1]

NMR assignments for 4,2'-difluorobenzanilide

| | | | | | | |
|---|---|---|---|---|---|---|
| Before | 10.14 p (1) s | 8.06 p (2) m | 7.60 p (1) tf | 7.37 p (2) m | 7.29 p (2) m | 7.23 p (1) m |

-continued

| | | | | | |
|---|---|---|---|---|---|
| After | 10.14 p (1) s | 8.06 p (2) m | 7.59 p (1) tf | 7.37 p (2) m | 7.29 p (2) m | 7.23 p (1) m |

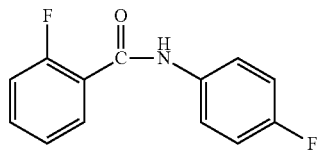 [SMILES: O=C(Nc1ccc(F)cc1)c1ccccc1F]

NMR assignments for 2,4'-difluorobenzanilide

| | | | | | |
|---|---|---|---|---|---|
| Before | 10.14 p (1) s | 8.06 p (2) m | 7.59 p (1) tf | 7.37 p (2) m | 7.29 p (2) m | 7.23 p (1) m |
| After | 10.14 p (1) s | 8.06 p (2) m | 7.59 p (1) tf | 7.37 p (2) m | 7.29 p (2) m | 7.23 p (1) m |

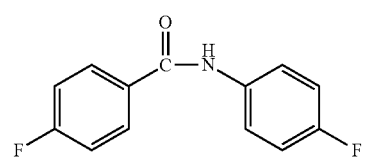 [SMILES: O=C(Nc1ccc(F)cc1)c1ccc(F)cc1]

NMR assignments for 4,4'-difluorobenzanilide

| | | | | | |
|---|---|---|---|---|---|
| Before | 10.32 p (1) s | 8.04 p (2) m | 7.78 p (2) m | 7.36 p (2) m | 7.19 p (2) m |
| After | 10.30 p (1) s | 8.03 p (2) m | 7.78 p (2) m | 7.37 p (2) m | 7.19 p (2) m |

The above data show no change in the amides after chlorination.

The above four isomers were carefully selected to have the desired electronics to diffuse the electron cloud around the lone electron pair on the nitrogen atom of the amide bond and to represent the different arrangements on the crosslinked polyamide membrane system. From these data, no chlorine degradation is demonstrated.

EXAMPLE 2

Linear polyamides would be chemically more similar to the cross-linked polyamide than the small molecular weight model amides used in Example 1; both the linear and cross-linked starting materials are polymers. The advantage of these linear polymers to the cross-linked polymers is solubility, making chemical measurements of chlorination possible.

The following linear polyamides were synthesized using similar procedures to the amide syntheses in Example 1 above:

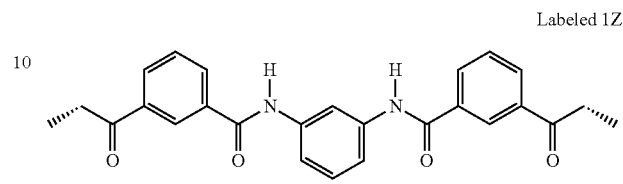

Labeled 1Z

-continued

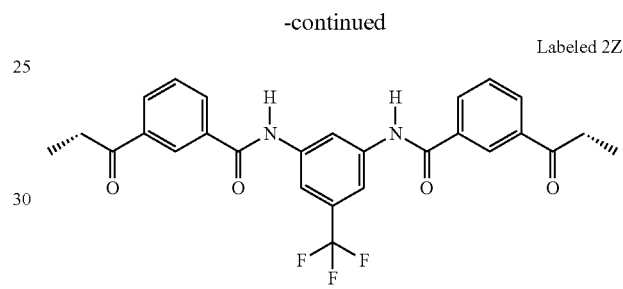

Labeled 2Z

Labeled 3Z

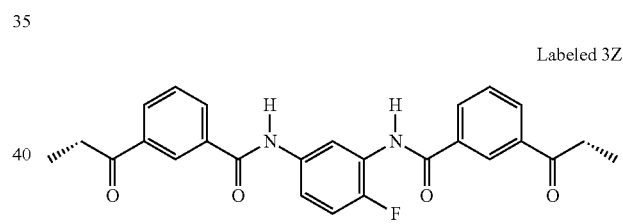

Labeled 4Z

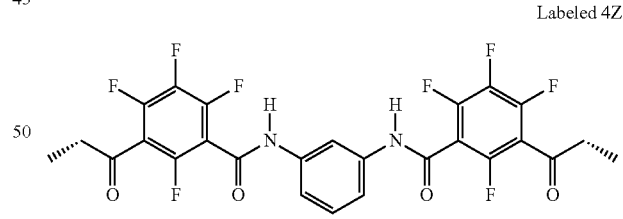

Labeled 5Z

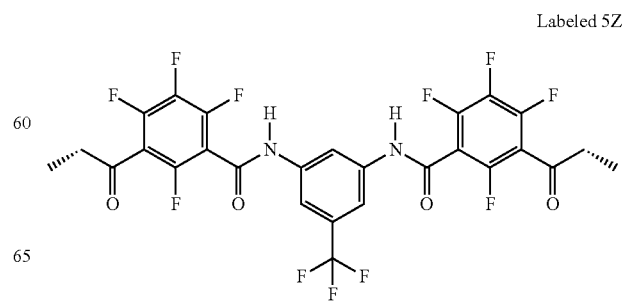

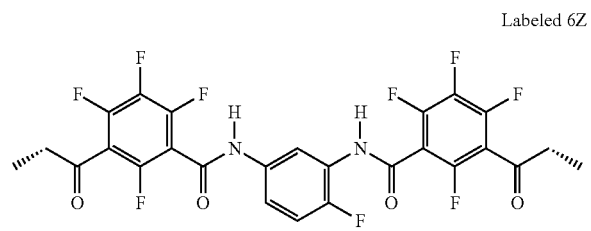

These six polyamides were chlorinated under more rigorous conditions than the amide study in Example 1.

The chlorine exposure would be the equivalent of 869,000 ppm-hrs or approximately the exposure an RO plant operating at 1 ppm chlorine for 99.2 years. Without enough exposure and, if many of these didn't fail, little could be learned regarding those that didn't fail. On the other hand, overexposure would destroy all polymer samples and nothing would be learned. Therefore, these conditions were arrived at so that most polymer samples would fail and the degree of failure could be documented.

The response on these linear polyamides was to measure the % chlorine in the exposed samples.

| Chlorine Addition to Linear Polyamides Sample | Sample Label | Moles of Chlorine added/monomer unit |
| --- | --- | --- |
| 1 | 1Z | 1.05 |
| 2 | 2Z | 0.72 |
| 3 | 3Z | 1.27 |
| 4 | 4Z | 1.00 |
| 5 | 5Z | 0.64 |
| 6 | 6Z | 1.41 |

Samples 2Z and 5Z show the least amount of chlorine addition and correspond to membranes made with the greatest electron withdrawing group the trifluoromethyl (note: trifluoromethyl is a stronger electron withdrawer than the fluoro group). This suggests that membranes made with this addition would be most preferred in preventing chlorine attack. Also, the data support that electron withdrawing on both sides is superior. 5Z is not attacked by chlorine to the extent of 2Z.

In this study, the fluoro group added to the amine side doesn't improve chlorine resistance compared to no fluoro groups. Note: 6Z and 3Z is actually attacked to a greater extent than 1Z.

In this study, a fully-fluorinated acid and a mono-fluorinated amine doesn't protect from chlorine attack. This may be due to weakening the amide bond resulting in hydrolysis and chlorine addition.

Again, these chlorine exposures are far in excess of what's needed for chlorine resistant membranes. Under conditions less rigorous, samples 2Z and 5Z that have the trifluoromethyl group, might have shown no chlorine addition.

EXAMPLE 3

A chlorine resistant polyamide membrane was made from the following equation:

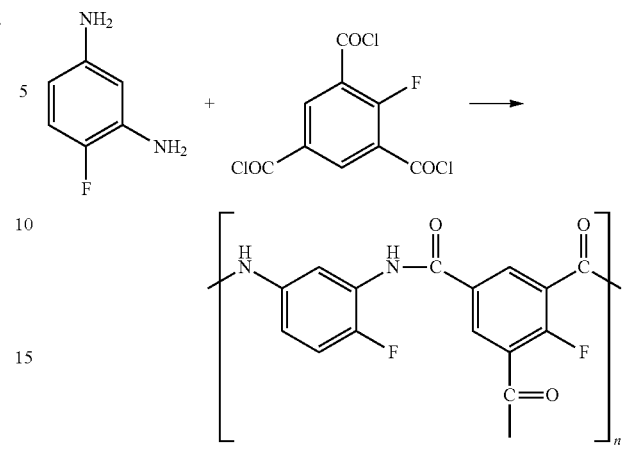

The following test conditions were used: 800 psi applied pressure, 32,000 mg/L sodium chloride, 1 hour test time, 3.5 mg/L chlorine when applicable.

| Polyamide Membrane ID | Amine Monomer | Acid Chloride Monomer | Reverse Osmosis Performance | |
| --- | --- | --- | --- | --- |
| | | | Water Flux, gfd | Rejection, % |
| SST 342 | 4-FMPD | MFTMC | 13.8 | 98.6 |
| SST 353 | 4-FMPD | MFTMC | 14.0 | 99.2 |
| SST 354 | 4-FMPD | MFTMC | 12.7 | 99.2 |

Note:
The notations below refer to the above amine and acid chloride.

These data demonstrate that membranes can be made with the above formulation.

EXAMPLE 4

Another chlorine resistant polyamide membrane was made from the following equation:

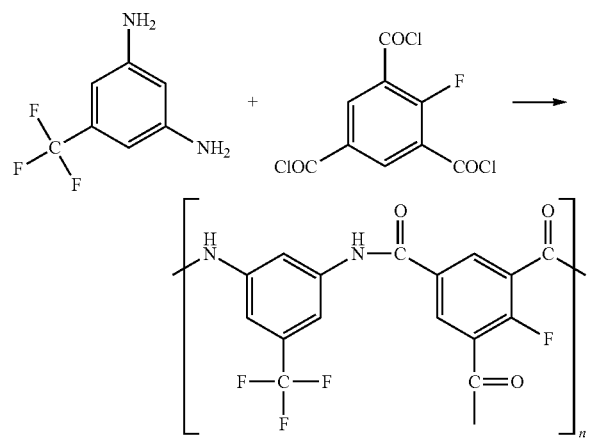

This membrane was tested for reverse osmosis membrane performance

| Membrane ID | Amine | Acid Chloride | Chorine Tested | RO Performance | |
|---|---|---|---|---|---|
| | | | | Water Flux, gfd | Salt Rejection, % |
| BOR 427-1 | DABTF | MFTMC | x | 17.4 | 94.2 |
| BOR 427-2 | DABTF | MFTMC | x | 17.3 | 95.5 |
| BOR 427-3 | DABTF | MFTMC | x | 16.0 | 95.2 |
| BOR 428-1 | DABTF | MFTMC | x | 5.3 | 98.2 |
| BOR 428-2 | DABTF | MFTMC | x | 9.5 | 97.5 |
| BOR 428-3 | DABTF | MFTMC | x | 5.6 | 98.2 |
| BOR 428-1 Jul. 15, 2012 | DABTF | MFTMC | x | 5.3 | 97.9 |
| BOR 428-2 Jul. 15, 2012 | DABTF | MFTMC | x | 7.0 | 97.6 |
| BOR 428-4 Jul. 15, 2012 | DABTF | MFTMC | x | 8.3 | 97.8 |
| BOR 428-5 Jul. 15, 2012 | DABTF | MFTMC | x | 9.2 | 98.1 |

Test conditions: 800 psi applied pressure, 32,000 mg/L sodium chloride, 1 hour test time, 3.5 mg/L chlorine when applicable.

Note: The notations below refer to the above amine and acid chloride.

These data demonstrate that membranes can be made with the above formulation.

The foregoing detailed description is for the purpose of illustration. Such detail is solely for that purpose and those skilled in the art can make variations therein without departing from the spirit and scope of the invention.

What is claimed:

1. A chlorine resistant polyamide comprising reaction product of an amine and an acid chloride monomer wherein both the amine and the acid chloride monomer are modified with electron—withdrawing such that exhibit sufficient activity to (i) minimize any chlorination on both the amine and acid chloride and (ii) minimize N-chlorination;
   the electron withdrawing groups are selected such that the electron-withdrawing group is provided on both end of the amide bond of the polyamide.

2. The chlorine resistant polyamide of claim 1 wherein the amine is selected from the group consisting of 4-fluoro-m-phenylenediamine, 2-fluoro-m-diphenylenediamine, 3,5-diaminobenzotrifluoride, 4,6-difluorobenzene-1,5-diamine, and mixtures thereof.

3. The chlorine resistant polyamide of claim 1 wherein said acid chloride monomer is selected from the group consisting of monofluorotrimesoyl chloride (MFTMC), perfluorotrimesoyl chloride (PFTMC), nitrotrimesoyl chloride (NTMC), perchlorotrimesoyl chloride (PCTMC), 1,3,5-benzenetri-(difluoroacetoyl chloride) and mixtures thereof.

4. A chlorine resistant membrane including a chlorine resistant polyamide wherein said chlorine resistant polyamide is a reaction product of an amine and an acid chloride monomer wherein both the amine and the acid chloride monomer are modified with electron-withdrawing groups that exhibit sufficient acitivity to (i) minimize any chlorination on both the amine and acid chloride and (ii) minimize N-chlorination; the electron withdrawing groups are selected such that the electron-withdrawing group is provided on both end of the amide bond of the polyamide.

5. The chlorine resistant membrane of claim 4 wherein said amine is selected from the group consisting of 4-fluoro-m-phenylenediamine, 2-fluoro-m-diphenylenediamine, 3,5-diaminobenzotrifluoride, 4,6-difluorobenzene-1,5-diamine, and mixtures thereof.

6. The chlorine resistant membrane of claim 4 wherein said acid chloride monomer is selected from the group consisting of monofluorotrimesoyl (MFTMC), perfluorotrimesoyl chloride (PFTMC), nitrotrimesoyl chloride (NTMC), perchlorotrimesoyl chloride (PCTMC), 1,3,5-benzenetri-(difluoroacetoyl chloride) and mixtures thereof.

7. A reverse osmosis desalination unit comprising a membrane support including a chlorine resistant membrane comprising a chlorine resistant polyamide wherein said chlorine resistant polyamide is a reaction product of an amine and an acid chloride monomer wherein both the amine and the acid chloride monomer are modified with electron-withdrawing groups that exhibit sufficient acitivity to (i) minimize any chlorination on both the amine and acid chloride and (ii) minimize N-chlorination; the electron withdrawing groups are selected such that the electron-withdrawing group is provided on both end of the amide bond of the polyamide.

8. The desalination unit of claim 7 wherein said amine of the chlorine resistant polyamide is selected from the group consisting of 4-fluoro-m-phenylenediamine, 2-fluoro-m-diphenylenediamine, 3,5-diamino benzotrifluoride, 4,6-difluorobenzene-1,5-diamine, and mixtures thereof.

9. The desalination unit of claim 7 wherein said acid chloride monomer of the chlorine resistant polyamide is selected from the group consisting of monofluorotrimesoyl chloride (MFTMC), perfluorotrimesoyl chloride (PFTMC), nitrotrimesoyl chloride (NTMC), perchlorotrimesoyl chloride (PCTMC), 1,3,5-benzenetri-(difluoroacetoyl chloride) and mixtures thereof.

* * * * *